United States Patent
Yang et al.

(10) Patent No.: US 12,139,771 B2
(45) Date of Patent: Nov. 12, 2024

(54) HIGH-STRENGTH STEEL SHEET AND METHOD FOR PRODUCING THE SAME

(71) Applicant: JFE Steel Corporation, Tokyo (JP)

(72) Inventors: Lingling Yang, Tokyo (JP); Tatsuya Nakagaito, Tokyo (JP); Yuki Takeda, Tokyo (JP)

(73) Assignee: JFE Steel Corporation, Tokyo (JP)

(*) Notice: Subject to any disclaimer, the term of this patent is extended or adjusted under 35 U.S.C. 154(b) by 593 days.

(21) Appl. No.: 17/425,453

(22) PCT Filed: Oct. 18, 2019

(86) PCT No.: PCT/JP2019/041132
§ 371 (c)(1),
(2) Date: Jul. 23, 2021

(87) PCT Pub. No.: WO2020/158066
PCT Pub. Date: Aug. 6, 2020

(65) Prior Publication Data
US 2022/0081734 A1   Mar. 17, 2022

(30) Foreign Application Priority Data
Jan. 30, 2019   (JP) ................... 2019-013797

(51) Int. Cl.
| | |
|---|---|
| *C21D 9/46* | (2006.01) |
| *B32B 15/01* | (2006.01) |
| *C21D 6/00* | (2006.01) |
| *C21D 8/02* | (2006.01) |
| *C22C 38/00* | (2006.01) |
| *C22C 38/02* | (2006.01) |
| *C22C 38/06* | (2006.01) |
| *C22C 38/08* | (2006.01) |
| *C22C 38/10* | (2006.01) |
| *C22C 38/26* | (2006.01) |
| *C22C 38/28* | (2006.01) |
| *C22C 38/32* | (2006.01) |
| *C22C 38/38* | (2006.01) |
| *C23C 2/02* | (2006.01) |
| *C23C 2/28* | (2006.01) |
| *C23C 2/40* | (2006.01) |

(52) U.S. Cl.
CPC .............. *C21D 9/46* (2013.01); *B32B 15/013* (2013.01); *C21D 6/001* (2013.01); *C21D 6/002* (2013.01); *C21D 6/005* (2013.01); *C21D 6/007* (2013.01); *C21D 6/008* (2013.01); *C21D 8/0205* (2013.01); *C21D 8/0226* (2013.01); *C21D 8/0236* (2013.01); *C22C 38/001* (2013.01); *C22C 38/002* (2013.01); *C22C 38/005* (2013.01); *C22C 38/008* (2013.01); *C22C 38/02* (2013.01); *C22C 38/06* (2013.01); *C22C 38/08* (2013.01); *C22C 38/10* (2013.01); *C22C 38/26* (2013.01); *C22C 38/28* (2013.01); *C22C 38/32* (2013.01); *C22C 38/38* (2013.01); *C23C 2/02* (2013.01); *C23C 2/0224* (2022.08); *C23C 2/28* (2013.01); *C23C 2/40* (2013.01); *C21D 2211/005* (2013.01); *C21D 2211/008* (2013.01)

(58) Field of Classification Search
CPC .......... C21D 9/46; C21D 6/001; C21D 6/002; C21D 6/005; C21D 6/007; C21D 6/008; C21D 8/0205; C21D 8/0226; C21D 8/0236; C21D 2211/005; C21D 2211/008; C21D 2211/001; B32B 15/013; C22C 38/001; C22C 38/002; C22C 38/005; C22C 38/008; C22C 38/02; C22C 38/06; C22C 38/08; C22C 38/10; C22C 38/26; C22C 38/28; C22C 38/32; C22C 38/38; C23C 2/40
USPC ........................................................ 148/533
See application file for complete search history.

(56) References Cited

U.S. PATENT DOCUMENTS

| | | | |
|---|---|---|---|
| 8,828,557 | B2 | 9/2014 | Takagi et al. |
| 9,708,679 | B2 | 7/2017 | Kawata et al. |
| 10,920,294 | B2 | 2/2021 | Kohsaka et al. |

(Continued)

FOREIGN PATENT DOCUMENTS

| | | |
|---|---|---|
| CN | 103857814 A | 6/2014 |
| CN | 107109571 A | 8/2017 |

(Continued)

OTHER PUBLICATIONS

Korean Written Decision on Registration for Korean Application No. 10-2021-7023747, dated Dec. 14, 2022 with translation, 4 pages.
International Search Report and Written Opinion for International Application No. PCT/JP2019/041132, dated Jan. 7, 2020, 4 pages.
Extended European Search Report for European Application No. 19912354.8, dated Mar. 21, 2022, 8 pages.
Chinese Office Action with Search Report for Chinese Application No. 201980090584.7, dated May 6, 2022, 7 pages.

(Continued)

*Primary Examiner* — Brian D Walck
*Assistant Examiner* — Danielle Carda
(74) *Attorney, Agent, or Firm* — Buchanan Ingersoll & Rooney PC

(57) ABSTRACT

A high-strength steel sheet that has a predetermined component composition, that has a steel microstructure in which an area percentage of ferrite ranges from 5% to 50% in a thickness cross-section in a rolling direction, a total area percentage of fresh martensite and retained γ ranges from 2% to 30%, each of the fresh martensite and the retained γ has an average grain size of 5 μm or less, and a ratio of the fresh martensite and the retained γ adjacent only to ferrite with respect to the fresh martensite and the retained γ from a surface to 200 μm in the thickness direction is 30% or less in total area percentage, and that has a yield strength of 550 MPa or more.

13 Claims, No Drawings

(56) References Cited

U.S. PATENT DOCUMENTS

| | | | |
|---|---|---|---|
| 2011/0030854 A1* | 2/2011 | Matsuda et al. | C21D 11/00 |
| | | | 148/504 |
| 2012/0222781 A1 | 9/2012 | Azuma et al. | |
| 2014/0193665 A1 | 7/2014 | Kawata et al. | |
| 2014/0212684 A1* | 7/2014 | Kawata | C23C 2/02 |
| | | | 148/533 |
| 2018/0016656 A1 | 1/2018 | Minami et al. | |
| 2019/0003009 A1 | 1/2019 | Kawata et al. | |
| 2019/0360081 A1 | 11/2019 | Minami et al. | |
| 2022/0098696 A1* | 3/2022 | Yang | C22C 38/08 |

FOREIGN PATENT DOCUMENTS

| | | |
|---|---|---|
| EP | 2738280 A1 | 6/2014 |
| EP | 2762579 A1 | 8/2014 |
| EP | 2762589 A1 | 8/2014 |
| EP | 3219821 A1 | 9/2017 |
| EP | 3508599 A1 | 7/2019 |
| EP | 3521474 A1 | 8/2019 |
| EP | 3556881 A1 | 10/2019 |
| EP | 3653745 A1 | 5/2020 |
| EP | 3663425 A1 | 6/2020 |
| JP | 04120242 A | 4/1992 |
| JP | 2011111673 A | 6/2011 |
| JP | 2011168880 A | 9/2011 |
| JP | 4924730 B2 | 4/2012 |
| JP | 5354135 B2 | 11/2013 |
| JP | 2016141858 A | 8/2016 |
| JP | 2016188395 A1 | 11/2016 |
| JP | 6292353 B2 | 3/2018 |
| JP | 6316154 B1 | 4/2018 |
| JP | 2018131648 A | 8/2018 |
| JP | 6443594 B1 | 12/2018 |
| KR | 20140041833 A | 4/2014 |
| WO | 2011065591 A1 | 6/2011 |
| WO | 2013018726 A1 | 2/2013 |
| WO | 2013018739 A1 | 2/2013 |
| WO | 2016103534 A1 | 6/2016 |
| WO | 2017108959 A1 | 6/2017 |
| WO | 2017164346 A1 | 9/2017 |
| WO | 2018043452 A1 | 3/2018 |
| WO | 2018062342 A1 | 4/2018 |
| WO | 2018159405 A1 | 9/2018 |

OTHER PUBLICATIONS

Extended European Search Report for European Application No. 19912842.2, dated Feb. 18, 2022, 8 pages.

International Search Report and Written Opinion for International Application No. PCT/JP2019/041131, dated Jan. 7, 2020, 5 pages.

Korean Written Decision on Registration for Korean Application No. 10-2021-7023746, dated Dec. 14, 2022 with translation, 4 pages including 2 pages of English Translation.

* cited by examiner

HIGH-STRENGTH STEEL SHEET AND METHOD FOR PRODUCING THE SAME

CROSS REFERENCE TO RELATED APPLICATIONS

This is the U.S. National Phase application of PCT/JP2019/041132, filed Oct. 18, 2019, which claims priority to Japanese Patent Application No. 2019-013797, filed Jan. 30, 2019, the disclosures of these applications being incorporated herein by reference in their entireties for all purposes.

FIELD OF THE INVENTION

The present invention relates to a high-strength steel sheet that is suitable for members to be used in transports, such as automobiles, has high workability, and has good fatigue properties even when subjected to repeated loads, and a method for producing the high-strength steel sheet.

BACKGROUND OF THE INVENTION

In recent years, in the moving body industry, for example, in the automobile industry, from the perspective of protecting the global environment, improved fuel efficiency of automobiles has always been an important issue to reduce carbon dioxide ($CO_2$) emission. To improve the fuel efficiency of automobiles, it is effective to decrease the weight of automotive bodies, and it is necessary to decrease the weight of automotive bodies while maintaining the strength of the automotive bodies. Weight reduction can be achieved by reinforcing a steel sheet used as a material for automotive components, simplifying the structure, and decreasing the number of components.

High-strength steel sheets with a yield strength of 550 MPa or more, however, typically contain large amounts of alloying elements required for reinforcement, and a heat-affected zone around a melted and solidified zone called a nugget has insufficient toughness particularly in resistance spot welding. Thus, when the shape of a welded portion is changed, the welded portion has a decreased fatigue strength. If the decrease in fatigue strength of welded portions can be reduced, the entire collision strength of automobiles can be sufficiently maintained. Although various techniques have been proposed, they are not directly focused on the fatigue strength of welded portions.

Patent Literature 1 discloses a high-strength cold-rolled steel sheet excellent in weldability and workability and a method for producing the high-strength cold-rolled steel sheet. Patent Literature 2 discloses a high-strength thin steel sheet and a hot-dip galvanized steel sheet each having a tensile strength of 780 MPa or more and good bending fatigue properties, and methods for producing the high-strength thin steel sheet and the hot-dip galvanized steel sheet. Patent Literature 3 discloses a high-strength hot-dip galvanized steel sheet with a tensile strength of 980 MPa or more and with high workability, high weldability, and good fatigue properties, and a method for producing the high-strength hot-dip galvanized steel sheet.

PATENT LITERATURE

PTL 1: Japanese Unexamined Patent Application Publication No. 2016-188395
PTL 2: Japanese Patent No. 6292353
PTL 3: Japanese Patent No. 4924730

SUMMARY OF THE INVENTION

The high-strength cold-rolled steel sheet disclosed in Patent Literature 1 is applied to a welded portion and a shock absorber. After a welded portion is changed in shape, however, the welded portion has a decreased fatigue strength and is finally broken, which leaves a problem in practical applications.

The high-strength hot-dip galvanized steel sheets described in Patent Literature 2 and Patent Literature 3 are effective for conventional static tensile shearing. It is, however, more preferable to reduce the decrease in fatigue strength of a welded portion after the welded portion is changed in shape.

As described above, these known techniques have a problem in the fatigue strength of a welded portion when the welded portion is changed in shape, and the problem is practically avoided by using a reinforcing member. This significantly limits the weight reduction effect.

Aspects of the present invention advantageously solve these problems of the related art and aim to provide a high-strength steel sheet that can improve the fatigue strength of a resistance spot welded portion and a method for producing the high-strength steel sheet.

To achieve these objects, the present inventors have extensively studied the fatigue strength of a resistance spot welded portion (hereinafter sometimes referred to simply as the fatigue strength of a welded portion), variously changed the microstructure before the thermal effects of welding were exerted in order to increase the toughness of a heat-affected zone, and have obtained the following knowledge.

(1) Cracking due to a decrease in fatigue strength of a spot welded portion after the welded portion is changed in shape can be suppressed by controlling the steel microstructure in the rolling direction such that the microstructure contains 2% to 30% of fresh martensite and retained $\gamma$ in total, the total area percentage of the fresh martensite and the retained $\gamma$ ranges from 2% to 30%, each of the fresh martensite and the retained $\gamma$ has an average grain size of 5 µm or less, and the ratio of the fresh martensite and the retained $\gamma$ adjacent only to ferrite with respect to the fresh martensite and the retained $\gamma$ from the surface layer to a portion with a thickness of 200 µm in the thickness direction is 30% or less in total area percentage.

(2) In a heat-affected zone, due to a difference in hardness of the microstructure, voids are easily formed at the interface between fresh martensite and ferrite, and voids are connected and cause a crack around a nugget. Thus, the total area percentage of fresh martensite and retained $\gamma$ adjacent only to ferrite can be controlled to suppress the formation of voids. Fine fresh martensite can prevent the development of formed cracks.

More specifically, aspects of the present invention provide the following.

[1] A high-strength steel sheet that has a component composition containing, on a mass percent basis:
C: 0.07% to 0.25%, Si: 0.01% to 1.80%, Mn: 1.8% to 3.2%, P: 0.05% or less, S: 0.02% or less, Al: 0.01% to 2.0%, and N: 0.01% or less, at least one of B: 0.0001% to 0.005%, Ti: 0.005% to 0.04%, and Nb: 0.005% to 0.06%, and a balance being Fe and incidental impurities, that has a steel microstructure in which an area percentage of ferrite ranges from 5% to 50% in a thickness cross-section in a rolling direction, a total area percentage of fresh martensite and retained $\gamma$ ranges from 2% to 30%, each of the fresh martensite and the retained $\gamma$ has an average grain size of 5 μm or less, and a ratio of the fresh martensite and the retained γ adjacent only to ferrite with respect to the fresh martensite and the retained γ from a surface to 200 μm in the thickness direction is 30% or less in total area percentage, and that has a yield strength of 550 MPa or more.

[2] The high-strength steel sheet according to [1], further containing: in addition to the component composition, at least one of Mo: 0.03% to 0.50% and Cr: 0.1% to 1.0% in a total of 1% or less on a mass percent basis.

[3] The high-strength steel sheet according to [1] or [2], further containing: in addition to the component composition, a total of 0.5% or less of at least one of Cu, Ni, Sn, As, Sb, Ca, Mg, Pb, Co, Ta, W, REM, Zn, V, Sr, Cs, and Hf on a mass percent basis.

[4] The high-strength steel sheet according to any one of [1] to [3], further including a coated layer on a surface of the steel sheet.

[5] The high-strength steel sheet according to [4], wherein the coated layer is a hot-dip galvanized layer or a galvannealed layer.

[6] A method for producing a high-strength steel sheet, including:
a hot-rolling step of hot-rolling a steel slab with the component composition according to any one of [1] to [3], cooling the hot-rolled steel sheet at an average cooling rate in the range of 10° C./s to 30° C./s, and coiling the hot-rolled steel sheet at a coiling temperature in the range of 400° C. to 700° C.;
a cold-rolling step of cold-rolling the hot-rolled steel sheet formed in the hot-rolling step; and
an annealing step of heating the cold-rolled steel sheet formed in the cold-rolling step to an annealing temperature at an average heating rate of 13° C./s or more in the temperature range of 600° C. to 700° C., then annealing the cold-rolled steel sheet in an annealing temperature range of 750° C. to 900° C. for an annealing time in the range of 30 to 200 seconds, reverse bending the cold-rolled steel sheet with a roll 800 mm or less in radius 7 to 13 times in total while annealing, cooling the cold-rolled steel sheet from the annealing temperature to a temperature range of 200° C. to 340° C. at an average cooling rate of 10° C./s or more, reheating the cold-rolled steel sheet to a temperature range of 350° C. to 600° C., and holding the temperature for 10 to 300 seconds.

[7] The method for producing a high-strength steel sheet according to [6], further including a coating step of performing a coating treatment after the annealing step.

[8] The method for producing a high-strength steel sheet according to [7], wherein the coating treatment is a hot-dip galvanizing treatment or a galvannealing treatment.

Aspects of the present invention can provide a high-strength steel sheet that can improve the fatigue strength of a resistance spot welded portion.

The high-strength in accordance with aspects of the present invention refers to a yield strength (yield point, YP) of 550 MPa or more.

DETAILED DESCRIPTION OF EMBODIMENTS OF THE INVENTION

Aspects of the present invention are specifically described below. The present invention is not limited to the following embodiments.

A steel sheet according to aspects of the present invention has a particular component composition and a particular steel microstructure. Thus, a steel sheet according to aspects of the present invention is described below in the order of the component composition and steel microstructure.

A steel sheet according to aspects of the present invention has the following component composition. The unit "%" of the component content in the following description means "% by mass".

C: 0.07% to 0.25%

C is an element necessary to form martensite and increase strength. A C content of less than 0.07% results in martensite with low hardness and a yield strength of less than 550 MPa. On the other hand, a C content of more than 0.25% results in the formation of a large amount of cementite in a heat-affected zone, which decreases the toughness of a martensite portion in the heat-affected zone and decreases the fatigue strength of a welded portion. Thus, the C content ranges from 0.07% to 0.25%, preferably 0.09% or more, preferably 0.20% or less, more preferably 0.11% or more, preferably 0.16% or less.

Si: 0.01% to 1.80%

Si is an element that increases the hardness of steel sheets by solid-solution strengthening. To consistently ensure high yield strength, the Si content should be 0.01% or more. A Si content of more than 1.80%, however, results in a welded portion with low toughness and a welded portion with low fatigue strength. Thus, the upper limit is 1.80%. Preferably, 0.3% or more, preferably 1.6% or less.

Mn: 1.8% to 3.2%

Mn is an element that increases the hardness of steel sheets by solid-solution strengthening. Mn is also an element that suppresses ferrite transformation and bainite transformation, forms martensite, and thereby increases the strength of the material. To consistently ensure high yield strength, the Mn content should be 1.8% or more. An increased amount of Mn, however, results in the formation of cementite by tempering, a heat-affected zone with low toughness, and a welded portion with low fatigue strength. Thus, the upper limit of Mn is 3.2%. Preferably, 2.3% or more, preferably 3.0% or less.

P: 0.05% or Less

P segregates at grain boundaries and reduces workability. Thus, the P content is 0.05% or less, preferably 0.03% or less, more preferably 0.02% or less. Although not particularly specified, the lower limit is preferably 0.0005% or more from the perspective of the economic efficiency of melting.

S: 0.02% or Less

S binds to Mn and forms coarse MnS, which reduces toughness. Thus, the S content is preferably minimized and may be 0.02% or less, preferably 0.01% or less, more preferably 0.002% or less. Although not particularly specified, the lower limit is preferably 0.0005% or more from the perspective of the economic efficiency of melting.

Al: 0.01% to 2.0%

Al is an element that acts as a deoxidizer. Deoxidation is important because a large amount of oxide in steel reduces toughness. Al may suppress the precipitation of cementite, and the Al content should be 0.01% or more to produce this effect. An Al content of more than 2.0%, however, results in the formation of coarse oxide or nitride aggregates, which reduce toughness. Thus, the Al content is 2.0% or less. Preferably 0.03% or more, preferably 0.1% or less.

N: 0.01% or Less

In accordance with aspects of the present invention, N is a harmful element and is preferably minimized. N binds to Ti and forms TiN. A N content of more than 0.01% results in an increased amount of TiN formed, which reduces the toughness of a welded portion. Thus, the N content is 0.01% or less, preferably 0.006% or less. Although not particularly specified, the lower limit is preferably 0.0005% or more from the perspective of the economic efficiency of melting.

At least one of B: 0.0001% to 0.005%, Ti: 0.005% to 0.04%, and Nb: 0.005% to 0.06%

B: 0.0001% to 0.005%

B strengthens grain boundaries and is therefore an element necessary to improve toughness. To sufficiently produce this effect, the B content should be 0.0001% or more. At a B content of more than 0.005%, however, B forms $Fe_{23}(CB)_6$ and reduces toughness. Thus, the B content is limited to the range of 0.0001% to 0.005%.

Ti: 0.005% to 0.04%

Ti binds to N, forms a nitride, suppresses the formation of BN, induces the effects of B, forms TiN and makes crystal grains finer, and improves toughness. To produce these effects, the Ti content should be 0.005% or more. These effects are saturated at a content of more than 0.04%. Furthermore, a content of more than 0.04% results in increased rolling load, which makes it difficult to consistently produce a steel sheet. Thus, the Ti content is limited to the range of 0.005% to 0.04%.

Nb: 0.005% to 0.06%

Nb is an element that further enhances the advantages according to aspects of the present invention. Nb decreases the size of martensite, prevents coarsening of crystal grains in a heat-affected zone, and improves the toughness of the heat-affected zone. To produce these effects, the Nb content should be 0.005% or more. A Nb content of more than 0.06%, however, results in the precipitation of Nb carbide and low toughness. Thus, the Nb content is limited to 0.06% or less, preferably 0.01% or more, preferably 0.04% or less.

These are base components. A high-strength steel sheet according to aspects of the present invention has a component composition that contains the base components and the remainder containing Fe (iron) and incidental impurities other than the base components. A high-strength steel sheet according to aspects of the present invention preferably has a component composition that contains the base components and the remainder composed of Fe and incidental impurities.

A high-strength steel sheet according to aspects of the present invention may contain the following components as optional components in addition to the above component composition.

A high-strength steel sheet according to aspects of the present invention may contain at least one of Mo: 0.03% to 0.50% and Cr: 0.1% to 1.0% in a total of 1% or less as an optional element in addition to the above component composition.

Mo: 0.03% to 0.50%

Mo promotes the nucleation of austenite and makes martensite finer. To produce these effects, Mo, if present, constitutes 0.03% or more. Segregation of Mo at grain boundaries stops the grain growth of ferrite and decreases the ferrite fraction. To prevent this, Mo, if present, constitutes 0.50% or less, more preferably 0.30% or less.

Cr: 0.1% to 1.0%

Cr is an element that has the effect of suppressing temper embrittlement. Thus, Cr further enhances the advantages according to aspects of the present invention. Thus, Cr, if present, constitutes 0.1% or more. A Cr content of more than 1.0%, however, results in the formation of Cr carbide and reduces the toughness of a heat-affected zone. Thus, Cr, if present, constitutes 1.0% or less.

A high-strength steel sheet according to aspects of the present invention may further contain, as an optional element, a total of 0.5% or less, preferably 0.1% or less, more preferably 0.03% or less, of at least one of Cu, Ni, Sn, As, Sb, Ca, Mg, Pb, Co, Ta, W, REM, Zn, V, Sr, Cs, and Hf, in addition to the above component composition.

Although the component composition of a high-strength steel sheet according to aspects of the present invention is described above, to produce the desired advantages according to aspects of the present invention, it is insufficient to only adjust the component composition in the above ranges, and it is important to control the steel microstructure to satisfy specific ranges.

A steel microstructure in accordance with aspects of the present invention is described below. A steel microstructure in accordance with aspects of the present invention is a microstructure in a thickness cross-section in the rolling direction.

Area Percentage of Ferrite: 5% to 50%

Ferrite has an effect of improving toughness. To produce such an effect, the area percentage is 5% or more. An area percentage of ferrite above 50%, however, results in a yield strength of less than 550 MPa. Thus, the area percentage of ferrite ranges from 5% to 50%. Preferably 10% or more, preferably 40% or less.

Total Area Percentage of Fresh Martensite and Retained γ: 2% to 30%

Fresh martensite is a hard phase and has an effect of increasing the strength of a steel sheet. Retained γ in accordance with aspects of the present invention is transformed to fresh martensite even by a small amount of strain. Thus, the total area percentage of fresh martensite and retained γ should be 2% or more to achieve the yield strength of 550 MPa. At an area percentage of more than 30%, however, the interface between fresh martensite and ferrite acts as a starting point for void formation and causes a crack. Thus, the total area percentage of fresh martensite and retained γ ranges from 2% to 30%, preferably 3% or more, preferably 25% or less.

Fresh martensite cannot be distinguished from retained γ with a scanning electron microscope. Thus, in accordance with aspects of the present invention, the total area percentage of fresh martensite and retained γ is the area percentage of the microstructure without cementite in grains and with a higher contrast than the ferrite phase when observed with a scanning electron microscope at a magnification of 3000 times.

Average Grain Size of Each of Fresh Martensite and Retained γ: 5 μm or Less

Fine fresh martensite and retained γ can prevent the development of formed cracks. To obtain such a result, each of fresh martensite and retained γ should have an average grain size of 5 μm or less, preferably 3 μm or less. The lower limit is preferably, but is not limited to, 1 μm or more.

Ratio of Fresh Martensite and Retained γ Adjacent Only to Ferrite with Respect to Fresh Martensite and Retained γ from Surface to 200 μm in Thickness Direction: 30% or Less in Total Area Percentage Due to a difference in hardness of the microstructure, voids are easily formed at the interface between fresh martensite and ferrite, and voids are connected and cause a crack around a nugget. To prevent the formation of voids, the total area percentage of fresh martensite and retained γ adjacent to only ferrite should be 30% or less. A crack tends to occur from the surface. Thus, to prevent cracking, the surface to 200 μm in the thickness direction was chosen.

Residual microstructures include tempered martensite, bainite, and pearlite and may constitute 93% or less. Tempered martensite may range from 40% to 85%. Bainite and pearlite may be 16% or less in total.

A high-strength steel sheet according to aspects of the present invention may have a coated layer. The coated layer may be of any type. Examples include hot-dip galvanized layers and galvannealed layers. In the presence of a coated layer, a surface specified in accordance with aspects of the present invention refers to an interface between the coated layer and a steel sheet.

A method for producing a high-strength steel sheet according to aspects of the present invention is described below.

A method for producing a high-strength steel sheet according to aspects of the present invention includes a hot-rolling step, a cold-rolling step, and an annealing step. When a high-strength steel sheet according to aspects of the present invention has a coated layer, a coating step is further included. Each of these steps is described below.

The hot-rolling step is the step of hot-rolling a steel slab with the above component composition, cooling the steel sheet at an average cooling rate in the range of 10° C./s to 30° C./s, and coiling the steel sheet at a coiling temperature in the range of 400° C. to 700° C.

In accordance with aspects of the present invention, steel can be melted by any method, for example, by a known melting method using a converter or an electric furnace. After the melting process, in consideration of problems, such as segregation, a steel slab (steel) is preferably produced by a continuous casting process. A steel slab may also be produced by a known casting process, such as an ingot making and blooming process or a thin slab continuous casting process. When the steel slab is hot-rolled after casting, the steel slab may be reheated in a furnace before rolling or may be directly rolled without being heated if a predetermined temperature or higher is maintained.

The steel thus produced is subjected to hot rolling including rough rolling and finish rolling. In accordance with aspects of the present invention, carbide in the steel is preferably dissolved before rough rolling. Thus, the steel slab is preferably heated to 1100° C. or more to dissolve carbide or prevent an increase in rolling force. The steel slab is preferably heated to 1300° C. or less to prevent an increase in scale loss. As described above, when the steel before rough rolling has a predetermined temperature or more and when carbide in the steel is dissolved, the steel is not necessarily heated before rough rolling. The rough rolling conditions are not particularly limited. The finish rolling is also not particularly limited.

Average Cooling Rate after Hot Rolling: 10° C./s to 30° C./s

When the average cooling rate to the coiling temperature after hot rolling is less than 10° C./s, ferrite grains do not grow, and the heat-affected zone has low toughness. On the other hand, when the average cooling rate is more than 30° C./s, ferrite grains grow excessively, and the strength is decreased. Thus, the average cooling rate ranges from 10° C./s to 30° C./s, preferably 15° C. or more, preferably 25° C./s or less.

Coiling Temperature: 400° C. to 700° C.

A coiling temperature of less than 400° C. results in the formation of a low-temperature transformed phase, such as bainite, and softening in a weld heat-affected zone. On the other hand, a coiling temperature of more than 700° C. results in an increased ferrite grain size and a ferrite area percentage of 50% or more. Thus, the coiling temperature ranges from 400° C. to 700° C., preferably 450° C. or more, preferably 650° C. or less.

The cold-rolling step is then performed. The cold-rolling step is the step of cold-rolling the hot-rolled steel sheet formed by the above method.

In the cold-rolling step, the rolling reduction is not particularly limited. For example, the rolling reduction is preferably adjusted in the range of 30% to 80%.

The annealing step is then performed. The annealing step is the step of heating the cold-rolled steel sheet formed in the cold-rolling step to an annealing temperature at an average heating rate of 13° C./s or more in the temperature range of 600° C. to 700° C., then annealing the cold-rolled steel sheet in an annealing temperature range of 750° C. to 900° C. for an annealing time in the range of 30 to 200 seconds, reverse bending the cold-rolled steel sheet with a roll 800 mm or less in radius 7 to 13 times in total while annealing, cooling the cold-rolled steel sheet from the annealing temperature to a temperature range of 200° C. to 340° C. at an average cooling rate of 10° C./s or more, reheating the cold-rolled steel sheet to a temperature range of 350° C. to 600° C., and holding the temperature for 10 to 300 seconds.

Heating Conditions in Annealing: Heating to the Annealing Temperature at an Average Heating Rate of 13° C./s or More in the Temperature Range of 600° C. to 700° C.

In the temperature range of 600° C. to the annealing temperature, rapid heating promotes austenite nucleation during reverse transformation and makes fresh martensite and retained γ finer. In accordance with aspects of the present invention, the average heating rate from 600° C. to 700° C. is 13° C./s or more so that each of fresh martensite and retained γ has an average grain size of 5 μm or less. The average heating rate from more than 700° C. to the annealing temperature is not particularly limited.

Annealing in Annealing Temperature Range of 750° C. to 900° C. for Annealing Time in the Range of 30 to 200 Seconds An annealing temperature of less than 750° C. or a holding time of less than 30 seconds results in low toughness due to residual unrecrystallized grains. On the other hand, an annealing temperature of more than 900° C. results in an increased fraction of fresh martensite and retained γ, an increased tempered region, and a heat-affected zone with low toughness. An annealing time of more than 200 seconds may result in low ductility and toughness due to a large amount of precipitated iron carbide. Thus, the annealing temperature ranges from 750° C. to 900° C., preferably 800° C. or more, preferably 900° C. or less. The holding time ranges from 30 to 200 seconds, preferably 50 seconds or more, preferably 150 seconds or less.

Reverse Bending with a Roll 800 mm or Less in Radius 7 to 13 Times in Total while Annealing A desired microstructure cannot be formed only by simple annealing. To adjust the ratio of fresh martensite and retained γ adjacent only to ferrite with respect to fresh martensite and retained γ from the surface layer to 200 μm in the thickness direction to 30% or less in total area percentage, it is necessary to perform reverse bending with a roll 800 mm or less in radius 7 to 13 times in total while annealing (in the annealing temperature range of 750° C. to 900° C. for 30 to 200 seconds). When the number of times of reverse bending is less than 7 or more than 13, the ratio of fresh martensite and retained γ adjacent only to ferrite with respect to fresh martensite and retained γ is more than 30% in total area percentage. Thus, the number of times of reverse bending ranges from 7 to 13, preferably 8 to 12. The number of times of reverse bending is not the number of reverse bending cycles but the sum of the number of times of bending and the number of times of unbending. The roll size is preferably 700 mm or less in radius. The roll size is preferably 200 mm or more in radius. Now, the term "reverse bending" means bending in one direction, and bending in the opposite direction repeatedly.

Average Cooling Rate from Annealing Temperature to Temperature Range of 200° C. to 340° C.: 10° C./s or More An average cooling rate of less than 10° C./s results in the growth of ferrite grains and an area percentage of ferrite above 50% and therefore results in a heat-affected zone with low toughness. Cooling from the annealing temperature to a temperature range of less than 200° C. results in a decreased total area percentage of fresh martensite and retained γ. On the other hand, cooling to a temperature range of more than 340° C. results in an increased total area percentage of fresh martensite and tends to result in the formation of cracks. Thus, the average cooling rate from the annealing temperature to the temperature range of 200° C. to 340° C. is 10° C./s or more.

Reheating Temperature: 350° C. to 600° C., Reheating Time: 10 to 300 Seconds

Reheating in a temperature range of less than 350° C. results in a total area percentage of fresh martensite and retained γ below 2% and tends to result in the formation of cracks. On the other hand, reheating at more than 600° C. or for less than 10 seconds results in an increased area percentage of ferrite from the surface layer to 200 μm in the thickness direction and a total area percentage of fresh martensite and retained γ adjacent only to ferrite above 30%. A reheating time of more than 300 seconds is undesirable in terms of productivity and results in promoted bainite transformation and a decreased strength. Thus, the reheating temperature ranges from 350° C. to 600° C., and the holding time ranges from 10 to 300 seconds.

The annealing step may be followed by a coating step of coating the surface of the steel sheet. As described above, the coated layer may be of any type in accordance with aspects of the present invention. Thus, the coating treatment may also be of any type. Examples include a hot-dip galvanizing treatment and a coating treatment including alloying after the hot-dip galvanizing treatment.

Examples

Slabs with component compositions listed in Table 1 were subjected to hot rolling, cold rolling, and annealing under the conditions listed in Table 2 to produce steel sheets. The roll size for reverse bending in the annealing step was 425 mm in radius. The steel sheets produced under the conditions listed in Table 2 were immersed in a coating bath to form 20 to 80 g/m$^2$ of a hot-dip galvanized layer. Part of the steel sheets were subjected to an alloying treatment after the formation of the hot-dip galvanized layer to form galvannealed steel sheets. The material classes are also listed in Table 2. The coating treatment was followed by cooling. Examination methods are described below.

TABLE 1

| Steel designation | Component composition (mass %) | | | | | | | | | | |
|---|---|---|---|---|---|---|---|---|---|---|---|
| | C | Si | Mn | P | S | Al | N | B | Ti | Nb | Others |
| A | 0.134 | 0.62 | 2.68 | 0.01 | 0.001 | 0.04 | 0.002 | 0.002 | 0.02 | 0.018 | — |
| B | 0.121 | 0.68 | 2.52 | 0.02 | 0.001 | 0.03 | 0.004 | 0.002 | 0.02 | 0.012 | Sn:0.002, Cu:0.02 |
| C | 0.145 | 0.05 | 2.12 | 0.02 | 0.002 | 0.04 | 0.003 | — | 0.03 | — | V:0.005 |
| D | 0.058 | 1.20 | 2.50 | 0.01 | 0.001 | 0.05 | 0.004 | 0.001 | 0.02 | 0.012 | — |
| E | 0.126 | 0.58 | 2.68 | 0.02 | 0.003 | 0.04 | 0.004 | 0.001 | 0.03 | 0.028 | Cr:0.12 |
| F | 0.086 | 1.10 | 3.12 | 0.02 | 0.001 | 0.04 | 0.005 | 0.001 | 0.01 | 0.011 | — |
| G | 0.121 | 1.71 | 2.56 | 0.02 | 0.018 | 0.03 | 0.007 | 0.003 | 0.01 | 0.011 | Ni:0.011 |
| H | 0.127 | 0.65 | 2.79 | 0.01 | 0.001 | 0.03 | 0.003 | 0.002 | 0.01 | 0.015 | — |
| I | 0.115 | 1.52 | 2.71 | 0.01 | 0.001 | 0.04 | 0.004 | 0.001 | 0.02 | — | Mo:0.04 |
| J | 0.256 | 0.72 | 1.96 | 0.01 | 0.002 | 0.03 | 0.003 | 0.002 | 0.02 | — | — |
| K | 0.101 | 0.65 | 1.64 | 0.02 | 0.003 | 0.05 | 0.006 | 0.002 | 0.01 | 0.045 | — |
| L | 0.119 | 0.63 | 2.46 | 0.01 | 0.001 | 0.03 | 0.004 | 0.001 | 0.02 | 0.022 | Pb:0.004, Cs:0.005 |
| M | 0.125 | 2.05 | 2.64 | 0.02 | 0.002 | 0.03 | 0.005 | 0.003 | 0.01 | — | — |
| N | 0.134 | 0.006 | 2.52 | 0.01 | 0.001 | 0.05 | 0.003 | 0.001 | 0.03 | 0.032 | — |
| O | 0.125 | 0.79 | 2.62 | 0.02 | 0.002 | 0.03 | 0.005 | 0.004 | 0.02 | 0.021 | Ta:0.002, Hf:0.004 |
| P | 0.095 | 0.62 | 3.41 | 0.01 | 0.002 | 0.04 | 0.004 | 0.001 | 0.02 | 0.026 | — |
| Q | 0.105 | 0.75 | 2.62 | 0.01 | 0.015 | 0.05 | 0.004 | 0.002 | 0.02 | — | As:0.006, Mo:0.09 |
| R | 0.115 | 0.63 | 2.58 | 0.02 | 0.001 | 0.04 | 0.005 | 0.004 | 0.03 | 0.015 | REM:0.24 |
| S | 0.117 | 0.60 | 2.55 | 0.01 | 0.001 | 0.06 | 0.003 | 0.002 | 0.01 | 0.015 | W:0.006 |
| T | 0.128 | 0.75 | 2.25 | 0.01 | 0.002 | 0.03 | 0.005 | 0.004 | 0.02 | — | Zn:0.08, V:0.05 |
| U | 0.109 | 0.86 | 2.45 | 0.02 | 0.003 | 0.09 | 0.004 | 0.001 | 0.03 | 0.012 | Ca:0.003 |
| V | 0.124 | 1.62 | 2.65 | 0.02 | 0.002 | 0.04 | 0.007 | 0.004 | 0.03 | 0.025 | Co:0.015 |
| W | 0.124 | 0.24 | 2.51 | 0.01 | 0.001 | 0.06 | 0.003 | 0.005 | 0.03 | 0.012 | Sb:0.003 |
| X | 0.119 | 0.58 | 3.05 | 0.02 | 0.002 | 0.05 | 0.004 | 0.002 | 0.01 | — | Mg:0.0004 |
| Y | 0.124 | 0.58 | 2.15 | 0.02 | 0.001 | 0.05 | 0.005 | 0.001 | 0.02 | — | Sr:0.008 |
| Z | 0.124 | 0.52 | 2.58 | 0.01 | 0.002 | 0.04 | 0.003 | | — | 0.045 | — |
| AA | 0.121 | 0.75 | 2.52 | 0.02 | 0.002 | 0.03 | 0.005 | 0.001 | 0.02 | 0.075 | — |
| AB | 0.123 | 0.58 | 2.69 | 0.02 | 0.002 | 0.03 | 0.004 | 0.001 | 0.02 | 0.003 | — |

*The underlines are outside the scope of the present invention.

TABLE 2

| | | Hot rolling | | | | Cold rolling | Annealing | | |
|---|---|---|---|---|---|---|---|---|---|
| | | Slab | | Average | | Rolling | Heating | Annealing | Annealing |
| No. | Steel designation | heating temperature (° C.) | Finishing temperature (° C.) | cooling rate (° C./s) | Coiling temperature (° C.) | reduction (%) | rate*1 (° C./s) | temperature (° C.) | time (s) |
| 1 | A | 1250 | 900 | 22 | 520 | 45 | 18 | 790 | 85 |
| 2 | A | 1250 | 900 | 20 | 500 | 46 | 18 | 770 | 85 |
| 3 | A | 1250 | 900 | 8 | 500 | 55 | 15 | 790 | 85 |
| 4 | A | 1250 | 900 | 38 | 500 | 55 | 15 | 790 | 85 |
| 5 | B | 1250 | 900 | 20 | 500 | 50 | 20 | 790 | 80 |
| 6 | B | 1250 | 900 | 20 | 500 | 50 | 20 | 810 | 80 |
| 7 | B | 1250 | 900 | 22 | 350 | 50 | 20 | 790 | 85 |
| 8 | B | 1250 | 900 | 22 | 710 | 50 | 20 | 790 | 85 |
| 9 | C | 1250 | 900 | 18 | 510 | 45 | 16 | 780 | 85 |
| 10 | C | 1250 | 900 | 18 | 510 | 45 | 16 | 780 | 85 |
| 11 | C | 1250 | 900 | 18 | 510 | 45 | 16 | 780 | 85 |
| 12 | C | 1250 | 900 | 18 | 510 | 45 | 16 | 780 | 85 |
| 13 | D | 1250 | 900 | 18 | 500 | 50 | 20 | 810 | 90 |
| 14 | E | 1250 | 900 | 25 | 510 | 45 | 20 | 790 | 80 |
| 15 | E | 1250 | 900 | 25 | 510 | 45 | 20 | 740 | 80 |
| 16 | E | 1250 | 900 | 25 | 510 | 45 | 20 | 920 | 80 |
| 17 | E | 1250 | 900 | 25 | 510 | 45 | 20 | 790 | 20 |
| 18 | E | 1250 | 900 | 25 | 510 | 45 | 20 | 790 | 220 |
| 19 | F | 1250 | 900 | 22 | 500 | 50 | 18 | 790 | 80 |
| 20 | G | 1250 | 900 | 25 | 510 | 45 | 18 | 790 | 85 |
| 21 | H | 1250 | 900 | 20 | 520 | 50 | 20 | 800 | 70 |
| 22 | H | 1250 | 900 | 20 | 520 | 50 | 8 | 800 | 70 |
| 23 | H | 1250 | 900 | 20 | 520 | 50 | 20 | 800 | 70 |
| 24 | H | 1250 | 900 | 20 | 520 | 50 | 20 | 800 | 70 |
| 25 | I | 1250 | 900 | 20 | 510 | 50 | 18 | 825 | 90 |
| 26 | J | 1250 | 900 | 25 | 510 | 45 | 20 | 800 | 80 |
| 27 | K | 1250 | 900 | 25 | 520 | 50 | 20 | 780 | 80 |
| 28 | L | 1250 | 900 | 20 | 510 | 50 | 15 | 790 | 80 |
| 29 | L | 1250 | 900 | 20 | 510 | 50 | 15 | 790 | 80 |
| 30 | L | 1250 | 900 | 20 | 510 | 50 | 15 | 790 | 80 |
| 31 | M | 1250 | 900 | 15 | 520 | 50 | 20 | 810 | 80 |
| 32 | N | 1250 | 900 | 15 | 520 | 50 | 20 | 770 | 80 |
| 33 | O | 1250 | 900 | 25 | 510 | 50 | 20 | 800 | 80 |
| 34 | O | 1250 | 900 | 25 | 510 | 50 | 20 | 800 | 80 |
| 35 | O | 1250 | 900 | 25 | 510 | 50 | 20 | 800 | 80 |
| 36 | P | 1250 | 900 | 22 | 500 | 50 | 20 | 790 | 80 |
| 37 | Q | 1250 | 900 | 20 | 500 | 50 | 15 | 800 | 80 |
| 38 | R | 1250 | 900 | 25 | 510 | 40 | 15 | 790 | 80 |
| 39 | S | 1250 | 900 | 20 | 520 | 40 | 15 | 780 | 85 |
| 40 | R | 1250 | 900 | 25 | 500 | 45 | 20 | 790 | 80 |
| 41 | T | 1250 | 900 | 20 | 510 | 50 | 20 | 800 | 80 |
| 42 | V | 1250 | 900 | 20 | 520 | 40 | 20 | 800 | 80 |
| 43 | W | 1250 | 900 | 20 | 520 | 40 | 20 | 800 | 80 |
| 44 | X | 1250 | 900 | 20 | 520 | 40 | 20 | 790 | 75 |
| 45 | Y | 1250 | 900 | 20 | 520 | 40 | 20 | 770 | 75 |
| 46 | Z | 1250 | 900 | 20 | 500 | 40 | 20 | 780 | 75 |
| 47 | AA | 1250 | 900 | 20 | 500 | 40 | 20 | 810 | 75 |
| 48 | AB | 1250 | 900 | 20 | 500 | 40 | 20 | 810 | 75 |

| No. | Steel designation | Annealing — Number of times of reverse bending with roll 800 mm or less in radius | Average cooling rate*2 (° C./s) | Cooling stop temperature (° C.) | Reheating temperature (° C.) | Holding time at reheating temperature (s) | Material Class | Note |
|---|---|---|---|---|---|---|---|---|
| 1 | A | 10 | 16 | 200 | 405 | 30 | GA | Exemplary steel |
| 2 | A | 9 | 16 | 200 | 400 | 30 | GA | Exemplary steel |
| 3 | A | 8 | 20 | 200 | 405 | 35 | GA | Comparative steel |
| 4 | A | 8 | 20 | 200 | 405 | 35 | GA | Comparative steel |
| 5 | B | 10 | 25 | 250 | 410 | 35 | GA | Exemplary steel |
| 6 | B | 10 | 25 | 250 | 410 | 35 | GA | Exemplary steel |
| 7 | B | 9 | 25 | 240 | 410 | 35 | GA | Comparative steel |
| 8 | B | 9 | 25 | 240 | 410 | 35 | GA | Comparative steel |
| 9 | C | 9 | 18 | 220 | 420 | 25 | GA | Exemplary steel |
| 10 | C | 9 | 8 | 220 | 420 | 30 | GA | Comparative steel |
| 11 | C | 5 | 18 | 220 | 420 | 35 | GA | Comparative steel |
| 12 | C | 15 | 18 | 220 | 420 | 40 | GA | Comparative steel |

TABLE 2-continued

| No. | Steel | *1 | | *2 | | | Coating | Category |
|---|---|---|---|---|---|---|---|---|
| *13* | D | 9 | 20 | 200 | 420 | 50 | GA | Comparative steel |
| *14* | E | 8 | 18 | 250 | 405 | 35 | GA | Exemplary steel |
| 15 | E | 8 | 18 | 250 | 405 | 35 | GA | Comparative steel |
| *16* | E | 8 | 18 | 250 | 405 | 35 | GA | Comparative steel |
| *17* | E | 8 | 18 | 250 | 405 | 35 | GA | Comparative steel |
| *18* | E | 8 | 18 | 250 | 405 | 35 | GA | Comparative steel |
| *19* | F | 9 | 25 | 330 | 500 | 75 | GA | Exemplary steel |
| 20 | G | 9 | 20 | 250 | 410 | 35 | GA | Exemplary steel |
| 21 | H | 10 | 20 | 200 | 410 | 30 | GA | Exemplary steel |
| *22* | H | 10 | 20 | 200 | 410 | 30 | GA | Comparative steel |
| *23* | H | 10 | 20 | *180* | 410 | 30 | GA | Comparative steel |
| *24* | H | 10 | 20 | *360* | 410 | 30 | GA | Comparative steel |
| 25 | I | 10 | 25 | *200* | 400 | 30 | GA | Exemplary steel |
| *26* | J | 8 | 20 | 200 | 410 | 35 | GA | Comparative steel |
| *27* | *K* | 8 | 20 | 200 | 420 | 35 | GA | Comparative steel |
| *28* | *L* | 10 | 20 | 250 | 400 | 40 | GA | Exemplary steel |
| *29* | L | 10 | 20 | 250 | *330* | 40 | GA | Comparative steel |
| *30* | L | 10 | 20 | 250 | *610* | 40 | GA | Comparative steel |
| *31* | M | 8 | 18 | 200 | *405* | 35 | GA | Comparative steel |
| *32* | *N* | 7 | 18 | 200 | 405 | 35 | GA | Comparative steel |
| *33* | *O* | 9 | 25 | 200 | 410 | 35 | GA | Exemplary steel |
| 34 | O | 9 | 25 | 200 | 410 | 7 | GA | Comparative steel |
| *35* | O | 9 | 25 | 200 | 410 | *310* | GA | Comparative steel |
| *36* | P | 8 | 25 | 250 | 450 | *75* | GA | Comparative steel |
| 37 | Q | 9 | 25 | 250 | 430 | 75 | GA | Exemplary steel |
| 38 | R | 8 | 20 | 250 | 410 | 40 | GA | Exemplary steel |
| 39 | S | 8 | 20 | 240 | 420 | 30 | GA | Exemplary steel |
| 40 | R | 9 | 22 | 250 | 400 | 30 | GA | Exemplary steel |
| 41 | T | 9 | 25 | 250 | 410 | 75 | GA | Exemplary steel |
| 42 | V | 9 | 22 | 200 | 405 | 35 | GA | Exemplary steel |
| 43 | W | 9 | 22 | 220 | 420 | 50 | GA | Exemplary steel |
| 44 | X | 10 | 25 | 250 | 410 | 45 | CR | Exemplary steel |
| 45 | Y | 9 | 25 | 200 | 410 | 45 | GI | Exemplary steel |
| 46 | Z | 10 | 25 | 200 | 400 | 45 | GI | Exemplary steel |
| *47* | *AA* | 9 | 25 | 250 | 400 | 35 | GA | Comparative steel |
| *48* | *AB* | 9 | 25 | 250 | 400 | 35 | GA | Comparative steel |

*1 Average heating rate from 600° C. to 700° C.
*2 Average cooling rate from annealing temparture to 200-340° C.
*The underlines are outside the scope of the present invention.

(1) Observation of Microstructure

A thickness cross-section of the steel sheets in the rolling direction was polished to show corrosion with 1% by mass nital. Ten fields from the surface to a portion with a thickness of ¼t are photographed with a scanning electron microscope at a magnification of 3000 times and are subjected to an intercept method according to ASTM E 112-10. "t" denotes the thickness of the steel sheet (sheet thickness). Ferrite is a microstructure without corrosion marks or cementite observed in grains, and fresh martensite (FM) and retained γ are microstructures without carbide observed in grains and microstructures observed with a higher contrast than ferrite.

The area percentage of ferrite, the total area percentage of fresh martensite and retained γ, the average grain size of fresh martensite and retained γ, and the ratio of fresh martensite and retained γ adjacent only to ferrite with respect to fresh martensite and retained γ from the surface to 200 μm in the thickness direction were determined by image analysis of results observed with the scanning electron microscope.

The area percentage of ferrite was determined by extracting only the ferrite portion in each microstructure field, determining the area percentage occupied by ferrite with respect to the observation field area, and averaging the area percentages of 10 fields. Likewise, the total area percentage of fresh martensite and retained γ was determined by extracting only the fresh martensite and retained γ portions in each observation field, determining the area percentage occupied by the fresh martensite and retained γ with respect to the observation field area, and averaging the area percentages of 10 fields. Fresh martensite and retained γ have an island form and are difficult to distinguish from each other. Thus, the average grain size of fresh martensite and retained γ is considered as a whole. More specifically, the average grain size of fresh martensite and retained γ was determined by calculating the equivalent circular diameter of the fresh martensite and the retained γ in each observation field and averaging the equivalent circular diameters of the fresh martensite and the retained γ of 10 fields.

"The ratio of fresh martensite and retained γ adjacent only to ferrite with respect to fresh martensite and retained γ from the surface to 200 μm in the thickness direction" was determined by photographing 10 fields from the surface to 200 μm in the thickness direction, identifying, by image analysis, fresh martensite and retained γ that are not in contact with microstructures other than ferrite even at one location in microstructure boundaries in each observation field, determining the area percentage, dividing the area percentage by the total area of fresh martensite and retained γ present in the observation field to determine "the ratio of fresh martensite and retained γ adjacent to ferrite with respect to fresh martensite and retained γ", and averaging the ratios of 10 fields. Tempered martensite, bainite, and pearlite were observed as other phases.

(2) Tensile Properties

A tensile test according to JIS Z 2241 was performed five times using No. 5 test specimens described in JIS Z 2201 having a longitudinal direction (tensile direction) that formed an angle of 90 degrees with the rolling direction. The average yield strength (YP), tensile strength (TS), and butt elongation (EL) were determined.

(3) Hole Expansion Ratio

It was based on the Japan Iron and Steel Federation standard JFST1001. A hole with an initial diameter $d_0$=10 mm was punched out and was expanded by raising a 60-degree conical punch. The punch was stopped when a crack passed through the thickness of the sheet. The diameter d of the punched hole was measured, and the hole expansion ratio was calculated using the following formula.

Hole expansion ratio (%)=$((d-d_0)/d_0) \times 100$

This test was performed three times in steel sheets of the same number to determine the average hole expansion ratio (λ).

(4) Weld Fatigue Test

Spot welding was performed under the conditions as follows: electrode: DR 6 mm-40R, pressure: 4802 N (490 kgf), weld time: 17 cycles. The current value was adjusted so that the nugget diameter was 6.5 mm, and cross-tension test specimens were prepared. A fatigue limit test was then performed 10 to 7 times at a test speed of 20 Hz, and a cross-tension test was performed in accordance with JIS Z 3137. A load range of 250 N or more was rated as "⊙", a load range of more than 180 N and less than 250 N was rated as "○", a load range of 110 N or more and less than 180 N was rated as "Δ", and a load range of less than 110 N was rated as "X".

Table 3 shows the results.

TABLE 3

| | Properties of steel sheet microstructure | | | | | Properties of steel sheet | | | | Weld | |
|---|---|---|---|---|---|---|---|---|---|---|---|
| No. | Ferrite (%) | FM + retained λ (%) | Tempered martensite (%) | Average grain size of FM + retained λ (μm) | Total area percentage of fresh martensite and retained λ adjacent only to ferrite phase (%) | Residual microstructures (bainite + pearlite) | YP (MPa) | TS (MPa) | EL (%) | λ (%) | fatigue test | Note |
| 1 | 16 | 8 | 65 | 1 | 20 | 11 | 890 | 1020 | 11.8 | 70 | ⊙ | Exemplary steel |
| 2 | 30 | 15 | 44 | 2 | 25 | 11 | 740 | 1000 | 13.1 | 55 | ⊙ | Exemplary steel |
| 3 | <u>2</u> | 12 | 75 | 3 | 25 | 11 | 700 | 1010 | 10.2 | 45 | X | Comparative steel |
| 4 | <u>55</u> | 4 | 36 | 2 | 75 | 5 | 520 | 860 | 15.6 | 30 | X | Comparative steel |
| 5 | <u>20</u> | 9 | 64 | 2 | <u>15</u> | 7 | <u>720</u> | 1020 | 13.2 | 50 | ⊙ | Exemplary steel |
| 6 | 10 | 8 | 75 | 1 | 15 | 7 | 850 | 1010 | 10.6 | 65 | ⊙ | Exemplary steel |
| 7 | <u>3</u> | 4 | 90 | 3 | <u>50</u> | 3 | 750 | 1040 | 12.5 | 45 | X | Comparative steel |
| 8 | <u>56</u> | 3 | 32 | 2 | <u>75</u> | 9 | 530 | 890 | 14.9 | 32 | X | Comparative steel |
| 9 | <u>10</u> | 6 | 75 | 1 | <u>12</u> | 9 | <u>850</u> | 1060 | 12.5 | 50 | ⊙ | Exemplary steel |
| 10 | <u>3</u> | 7 | 80 | 1 | 25 | 10 | 540 | 940 | 14.5 | 45 | X | Comparative steel |
| 11 | 15 | 5 | 70 | 1 | <u>75</u> | 10 | <u>820</u> | 1030 | 13.1 | 40 | X | Comparative steel |
| 12 | 13 | 5 | 70 | 1 | <u>74</u> | 12 | 830 | 1020 | 12.9 | 40 | X | Comparative steel |
| 13 | <u>60</u> | 3 | 30 | 2 | <u>75</u> | 7 | 500 | 790 | 16.2 | 35 | X | Comparative steel |
| 14 | <u>18</u> | 8 | 69 | 2 | <u>18</u> | 5 | <u>710</u> | 1035 | 13.6 | 45 | ⊙ | Exemplary steel |
| 15 | <u>4</u> | 4 | 85 | 1 | <u>75</u> | 7 | <u>545</u> | 860 | 10.2 | 20 | X | Comparative steel |
| 16 | <u>4</u> | 2 | 86 | 2 | <u>50</u> | 8 | <u>540</u> | 880 | 10.5 | 60 | X | Comparative steel |
| 17 | <u>5</u> | 3 | 85 | 1 | <u>75</u> | 7 | <u>535</u> | 870 | 10.5 | 20 | X | Comparative steel |
| 18 | 15 | 2 | 70 | 2 | <u>80</u> | 13 | <u>650</u> | 1020 | 9.2 | 30 | X | Comparative steel |
| 19 | 35 | 5 | 45 | 2 | <u>28</u> | 15 | 610 | 950 | 15.2 | 40 | ○ | Exemplary steel |
| 20 | 25 | 10 | 52 | 3 | 25 | 13 | 750 | 1030 | 13.9 | 45 | ○ | Exemplary steel |
| 21 | 15 | 9 | 68 | 2 | 15 | 8 | 780 | 1020 | 12.6 | 55 | ⊙ | Exemplary steel |
| 22 | 22 | 9 | 60 | 7 | 40 | 9 | 620 | 680 | 15.6 | 45 | X | Comparative steel |
| 23 | 20 | <u>1</u> | 73 | 2 | <u>80</u> | 6 | <u>545</u> | 920 | 12.5 | 70 | X | Comparative steel |
| 24 | 18 | <u>35</u> | 40 | 6 | <u>65</u> | 7 | <u>800</u> | 1080 | 10.6 | 20 | X | Comparative steel |
| 25 | 16 | <u>12</u> | 62 | 2 | <u>28</u> | 10 | 810 | 995 | 15.4 | 60 | ○ | Exemplary steel |
| 26 | <u>2</u> | 32 | 60 | 7 | 40 | 6 | 910 | 1250 | 9.3 | 15 | X | Comparative steel |
| 27 | <u>55</u> | <u>1</u> | 38 | 3 | <u>75</u> | 6 | <u>540</u> | 860 | 15.9 | 30 | X | Comparative steel |
| 28 | <u>22</u> | <u>10</u> | 60 | 2 | <u>20</u> | 8 | <u>730</u> | 1025 | 13.5 | 55 | ⊙ | Exemplary steel |
| 29 | 24 | <u>1</u> | 70 | 2 | 72 | 5 | 700 | 1000 | 13.8 | 50 | X | Comparative steel |
| 30 | 23 | <u>4</u> | 65 | 3 | <u>80</u> | 8 | 680 | 980 | 13.6 | 40 | X | Comparativesteel |
| 31 | 20 | 8 | 63 | 2 | <u>50</u> | 9 | 760 | 1020 | 13.4 | 50 | X | Comparative steel |
| 32 | 25 | 3 | 64 | 6 | <u>50</u> | 8 | <u>545</u> | 900 | 12.9 | 40 | X | Comparative steel |
| 33 | 18 | 10 | 60 | 2 | <u>15</u> | 12 | <u>790</u> | 1030 | 12.9 | 50 | ⊙ | Exemplary steel |
| 34 | 15 | 9 | 70 | 2 | <u>78</u> | 6 | 780 | 1025 | 13.3 | 45 | X | Comparative steel |
| 35 | 17 | 6 | 69 | 2 | <u>65</u> | 8 | <u>540</u> | 880 | 12.8 | 35 | X | Comparative steel |
| 36 | 30 | 6 | 58 | 2 | <u>72</u> | 6 | <u>545</u> | 920 | 14.8 | 35 | X | Comparative steel |
| 37 | 25 | 8 | 58 | 1 | <u>15</u> | 9 | <u>770</u> | 1000 | 13.5 | 40 | ○ | Exemplary steel |
| 38 | 20 | 11 | 56 | 2 | 20 | 13 | 740 | 1030 | 13.8 | 50 | ⊙ | Exemplary steel |
| 39 | 22 | 10 | 54 | 2 | 25 | 14 | 735 | 1020 | 13.2 | 45 | ⊙ | Exemplary steel |
| 40 | 20 | 8 | 56 | 2 | 15 | 16 | 700 | 1020 | 14.5 | 50 | ⊙ | Exemplary steel |
| 41 | 23 | 9 | 54 | 1 | 18 | 14 | 760 | 980 | 14.2 | 40 | ⊙ | Exemplary steel |
| 42 | 20 | 9 | 55 | 2 | 20 | 16 | 785 | 1020 | 13.4 | 50 | ○ | Exemplary steel |
| 43 | 18 | 9 | 66 | 2 | 25 | 7 | 630 | 920 | 14.3 | 45 | ○ | Exemplary steel |
| 44 | 20 | 11 | 63 | 2 | 25 | 6 | 700 | 1020 | 14.1 | 45 | ○ | Exemplary steel |
| 45 | 40 | 6 | 45 | 2 | 28 | 9 | 640 | 960 | 16.1 | 30 | ○ | Exemplary steel |
| 46 | 22 | 9 | 60 | 1 | 28 | 9 | 725 | 1015 | 15.2 | 40 | ○ | Exemplary steel |
| 47 | 8 | 8 | 80 | 1 | 35 | 4 | 860 | 1060 | 12.8 | 20 | X | Comparative steel |
| 48 | 10 | 4 | 76 | <u>7</u> | <u>50</u> | 10 | 720 | 1030 | 13.7 | 25 | X | Comparative steel |

*The underlines are outside the scope of present invention.
FM: Fresh martensite

The invention claimed is:

1. A high-strength steel sheet that has a component composition comprising, on a mass percent basis:
C: 0.07% to 0.25%,
Si: 0.01% to 1.80%,
Mn: 1.8% to 3.2%,
P: 0.05% or less,
S: 0.02% or less,
Al: 0.01% to 2.0%, and
N: 0.01% or less;
at least one of
B: 0.0001% to 0.005%,
Ti: 0.005% to 0.04%, and
Nb: 0.005% to 0.06%; and
a balance being Fe and incidental impurities,
that has a steel microstructure in which an area percentage of ferrite ranges from 5% to 50% in a thickness cross-section in a rolling direction, a total area percentage of fresh martensite and retained γ ranges from 2% to 30%, each of the fresh martensite and the retained γ has an average grain size of 5 μm or less, and a ratio of the fresh martensite and the retained γ adjacent only to ferrite with respect to the fresh martensite and the retained γ from a surface to 200 μm in the thickness direction is 30% or less in total area percentage, and
that has a yield strength of 550 MPa or more.

2. The high-strength steel sheet according to claim 1, further comprising: in addition to the component composition, at least one selected from at least one of groups A and B
group A: at least one of Mo: 0.03% to 0.50% and Cr: 0.1% to 1.0% in a total of 1% or less on a mass percent basis, and
group B: a total of 0.5% or less of at least one of Cu, Ni, Sn, As, Sb, Ca, Mg, Pb, Co, Ta, W, REM, Zn, V, Sr, Cs, and Hf on a mass percent basis.

3. The high-strength steel sheet according to claim 2, further comprising a coated layer on a surface of the steel sheet.

4. The high-strength steel sheet according to claim 3, wherein the coated layer is a hot-dip galvanized layer or a galvannealed layer.

5. The high-strength steel sheet according to claim 1, further comprising a coated layer on a surface of the steel sheet.

6. The high-strength steel sheet according to claim 5, wherein the coated layer is a hot-dip galvanized layer or a galvannealed layer.

7. The high-strength steel sheet according to claim 1, wherein the steel microstructure includes a total area percentage of tempered martensite of 52% or more.

8. A method for producing the high-strength steel sheet according to claim 1, comprising:
a hot-rolling step of hot-rolling a steel slab with the component composition, cooling the hot-rolled steel sheet at an average cooling rate in the range of 10° C./s to 30° C./s, and coiling the hot-rolled steel sheet at a coiling temperature in the range of 400° C. to 700° C.;
a cold-rolling step of cold-rolling the hot-rolled steel sheet formed in the hot-rolling step; and
an annealing step of heating the cold-rolled steel sheet formed in the cold-rolling step to an annealing temperature at an average heating rate of 13° C./s or more in the temperature range of 600° C. to 700° C., then annealing the cold-rolled steel sheet in an annealing temperature range of 750° C. to 900° C. for an annealing time in the range of 30 to 200 seconds, reverse bending the cold-rolled steel sheet with a roll 800 mm or less in radius 7 to 13 times in total while annealing, cooling the cold-rolled steel sheet from the annealing temperature to a temperature range of 200° C. to 340° C. at an average cooling rate of 10° C./s or more, reheating the cold-rolled steel sheet to a temperature range of 350° C. to 600° C., and holding the temperature for 10 to 300 seconds.

9. The method for producing a high-strength steel sheet according to claim 8, further comprising a coating step of performing a coating treatment after the annealing step.

10. The method for producing a high-strength steel sheet according to claim 9, wherein the coating treatment is a hot-dip galvanizing treatment or a galvannealing treatment.

11. A method for producing the high-strength steel sheet according to claim 10, comprising:
a hot-rolling step of hot-rolling a steel slab with the component composition, cooling the hot-rolled steel sheet at an average cooling rate in the range of 10° C./s to 30° C./s, and coiling the hot-rolled steel sheet at a coiling temperature in the range of 400° C. to 700° C.;
a cold-rolling step of cold-rolling the hot-rolled steel sheet formed in the hot-rolling step; and
an annealing step of heating the cold-rolled steel sheet formed in the cold-rolling step to an annealing temperature at an average heating rate of 13° C./s or more in the temperature range of 600° C. to 700° C., then annealing the cold-rolled steel sheet in an annealing temperature range of 750° C. to 900° C. for an annealing time in the range of 30 to 200 seconds, reverse bending the cold-rolled steel sheet with a roll 800 mm or less in radius 7 to 13 times in total while annealing, cooling the cold-rolled steel sheet from the annealing temperature to a temperature range of 200° C. to 340° C. at an average cooling rate of 10° C./s or more, reheating the cold-rolled steel sheet to a temperature range of 350° C. to 600° C., and holding the temperature for 10 to 300 seconds.

12. The method for producing a high-strength steel sheet according to claim 11, further comprising a coating step of performing a coating treatment after the annealing step.

13. The method for producing a high-strength steel sheet according to claim 12, wherein the coating treatment is a hot-dip galvanizing treatment or a galvannealing treatment.

* * * * *